J. Keane,
Water Closet Valve.
No. 89,151. Patented Apr. 20, 1869.
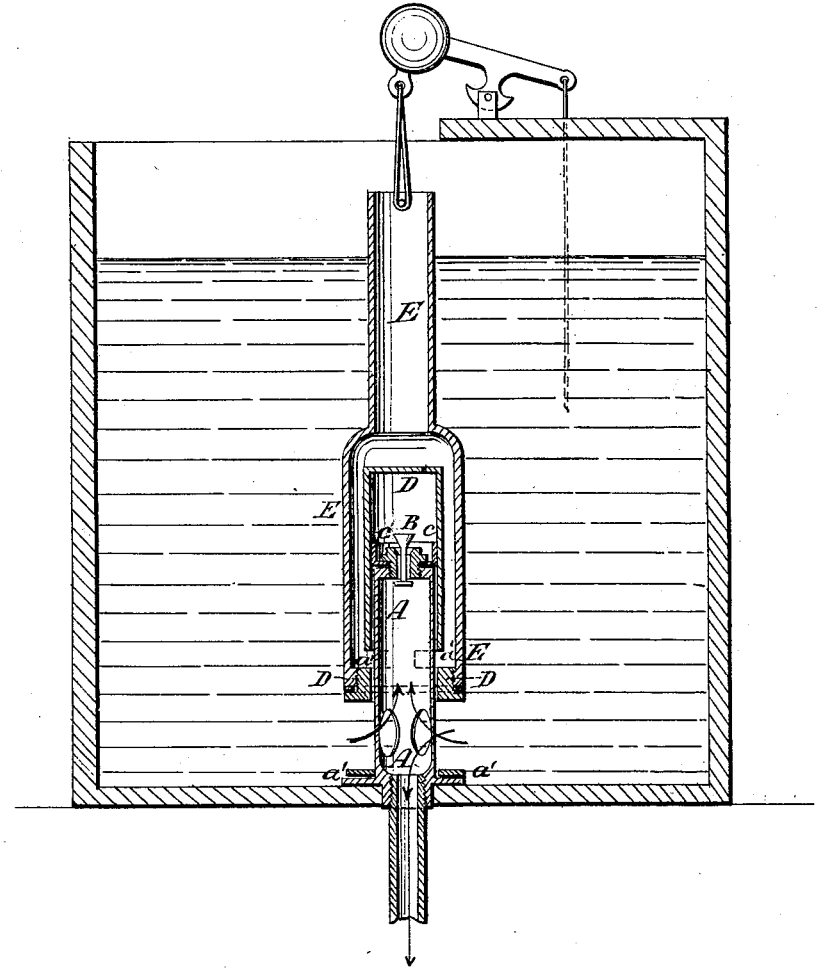
Witnesses.
Wm A Morgan
G. C. Cotton
Inventor.
J. Keane
per Munn & Co
Attys.

UNITED STATES PATENT OFFICE.

JOHN KEANE, OF NEW YORK, N. Y., ASSIGNOR TO HIMSELF AND G. H. BROWN.

IMPROVEMENT IN SLOWLY-CLOSING VALVES.

Specification forming part of Letters Patent No. 89,151, dated April 20, 1869; antedated April 15, 1869.

*To all whom it may concern:*

Be it known that I, JOHN KEANE, of the city, county, and State of New York, have invented a new and Improved Hydro-Valve; and I do hereby declare that the following is a full, clear, and exact description thereof, which will enable others skilled in the art to make and use the same, reference being had to the accompanying drawing, forming a part of this specification.

The figure is a longitudinal section of my improved valve.

My invention has for its object to furnish an improved water-valve for water-closet cisterns, which shall be so constructed and arranged as to entirely obviate the necessity of a service-box, thus simplifying the construction and diminishing the cost; and it consists in the construction and combination of the various parts, as hereinafter more fully described.

A is a pipe, the lower end of which passes through the bottom of the water-cistern, and to the lower end of which is attached the service-pipe leading to the water-closet. The lower part of the pipe A has one or more holes formed through it of such a form and size that when it is uncovered the water may flow into and through it freely.

In the top or upper end of the pipe A is placed an ordinary check-valve, B, opening upward.

To the upper end of the pipe A is attached leather or other packing, C, so that the upper end of the pipe A may move up and down in the pipe or chamber D water-tight.

Upon the lower part of the pipe A, just below the holes through its sides, is formed a flange, $a'$, upon which a packing is placed, upon which the flanged lower end of the pipe or chamber D rests, so as to make the connection water-tight. The pipe D has a screw-thread cut upon its lower end, which screws into a screw-thread cut in the lower end of the pipe E, so that the pipes D and E may move up and down together. The lower part of the pipe E is made a little larger than the pipe D, and the pipe D is made a little larger than the pipe A, and has one or more openings, $d'$, formed through the sides of its lower part, so that the water of the cistern may circulate freely through all parts of the apparatus except the upper part of the pipe D. The closed upper end of the pipe D has a small hole formed through it, as shown in the figure.

The valve is operated in the ordinary manner by means of a weighted lever and wire connected with the upper end of the pipe E. When the pipes E and D are raised, uncovering the holes through the sides of the pipe A, the water flows down through said latter pipe into the water-closet. It also rises through the upper part of the pipe, opens the valve B, and fills the part of the chamber or pipe D above the packed upper end of the said pipe A, in which chamber a vacuum would otherwise be formed by raising the pipes D and E. Then, as the pipes D and E are released, they can only descend as the water flows or is forced out of the upper part of the pipe or chamber D through the small hole in the upper end of the said pipe D. This furnishes the after-wash, and renders the employment of a service-box unnecessary.

Having thus described my invention, what I claim as new, and desire to secure by Letters Patent, is—

The pipe A, having one or more holes or openings in the lower parts of its sides, and a packing, C, attached to and a valve, B, placed in the upper end, and the pipe or chamber D, having one or more openings formed in the lower part of its sides, and a small hole formed through its top or upper end, in combination with each other and with the pipe E, substantially as herein shown and described, and for the purpose set forth.

The above specification of my invention signed by me this 9th day of June, 1868.

JOHN KEANE.

Witnesses:
 ALEX. F. ROBERTS,
 JAMES T. GRAHAM.